United States Patent [19]

Feichtinger

[11] Patent Number: 4,663,851

[45] Date of Patent: May 12, 1987

[54] POSITION MEASURING INSTRUMENT

[75] Inventor: Kurt Feichtinger, Palling, Fed. Rep. of Germany

[73] Assignee: Dr. Johannes Heidenhain GmbH, Traunreut, Fed. Rep. of Germany

[21] Appl. No.: 786,805

[22] Filed: Oct. 11, 1985

[30] Foreign Application Priority Data

Oct. 12, 1984 [DE] Fed. Rep. of Germany ....... 3437515

[51] Int. Cl.⁴ .............................................. G01D 5/36
[52] U.S. Cl. .............................. 33/1 PT; 250/231 SE
[58] Field of Search .............................. 33/1 N, 1 PT; 250/231 SE

[56] References Cited

U.S. PATENT DOCUMENTS

| | | | |
|---|---|---|---|
| 3,894,232 | 7/1975 | Laspesa | 250/231 SE |
| 3,900,732 | 8/1975 | Costales | 250/231 SE |
| 4,031,441 | 6/1977 | Garrett | 250/231 SE |
| 4,338,517 | 7/1982 | Perrine | 250/231 SE |
| 4,342,909 | 8/1982 | Accattino | 250/231 SE |
| 4,345,149 | 8/1982 | Blaser | 250/231 SE |
| 4,475,034 | 10/1984 | Maddox et al. | 250/231 SE |
| 4,512,184 | 4/1985 | Ernst et al. | 73/116 |

FOREIGN PATENT DOCUMENTS 153120 9/1984 Japan ............................ 250/231 SE

OTHER PUBLICATIONS

Verf. Dipl.-Phys. F. Hock, Fotoelektrische Winkel- und Wegschrittgeber, Oct. 1961.
Neuere Entwicklungen bei fotoelektrischen Langenmessgeraten, Jun. 1974, pp. 371-374.
Geratehandbuch Fur Einbau-Winkelmesseinrichtung (19384 Striche).

Primary Examiner—Richard R. Stearns
Attorney, Agent, or Firm—Willian Brinks Olds Hofer Gilson & Lione Ltd.

[57] ABSTRACT

A position measuring instrument comprising a graduation unit and a scanning unit. The graduation unit comprises a centering flange, a graduation carrier and a measuring graduation located on the graduation carrier. The scanning unit comprises a scanning component which comprises a scanning graduation and a stop. During assembly, the scanning unit is positioned radially with respect to the graduation carrier by positioning the stop against the centering flange. The scanning component may then be moved along a guide towards the measuring graduation. As the scanning component is moved towards the measuring graduation the stop no longer contacts the centering flange. A spacing foil removably sandwiched between the measuring graduation and the scanning graduation is used to position the scanning graduation at a predetermined distance from the measuring graduation. A locking means is then used to prevent further movement of the scanning component along the guide.

6 Claims, 3 Drawing Figures

POSITION MEASURING INSTRUMENT

BACKGROUND OF THE INVENTION

The present invention relates to a position measuring instrument comprising a scanning device and a measuring graduation, wherein the scanning device is adjustable in directions parallel to and perpendicular to a measuring direction defined by the measuring graduation.

Position measuring instruments may be used to measure the relative position of two objects movable relatively to one another. Typically, the measuring instrument comprises a scanning device, mounted to one of the movable objects, and a measuring graduation capable of being scanned by the scanning device, mounted to the other one of the movable objects. Thus, relative movement of the two objects will produce relative movement of the measuring graduation with respect to the scanning device. Measuring instruments of this type are often used on machine tools to measure the relative position of various machine tool components.

Angle measuring instruments are known wherein the instrument is not supplied by the manufacturer as an assembled device, but rather as components that must be assembled on the customer's machines. If position measurements on these machines are to be precise, then the position measuring instrument must be designed accordingly. This can lead to considerable expense in the assembly and the adjustment of the measuring instrument.

Typically, such measuring instruments comprise a scanning unit and a measuring graduation unit. The graduation unit often comprises a graduation carrier, with an angle graduation in the form of a circle, and is cemented with appropriate accuracy to a centering flange. The graduation unit is then mounted by the customer on a machine shaft and centered for concentricity. The scanning device, with its scanning graduation, frequently is mounted on an assembly surface of the machine and must be very accurately positioned with respect to the angle graduation. This positioning is performed by means of an assembly stop located on the scanning unit. The stop is set against a very precisely manufactured assembly flange on the machine. The assembly flange must be accurately manufactured because any deviation from concentricity with respect to the graduation carrier will produce measurement errors.

Ordinarily, the centering flange of the graduation carrier would be an ideal adjustment aid. However, since the assembly stop of the scanning unit would have to lie against the flange, friction would develop between the centering flange and the assembly stop. Therefore, use of the centering flange as an adjustment aid in this manner is precluded.

This leads to use of the assembly flange of the machine as the adjustment aid. However, since the required tolerances of the assembly flange for positioning purposes are of the order of a few microns, the machine manufacturer may be pushed to the limits of his manufacturing ability.

It is an object of the present invention to create a position measuring instrument that avoids the aforementioned disadvantages, and in which the constructive features required for the exact adjustment are provided by the measuring instrument manufacturer.

SUMMARY OF THE INVENTION

This invention is directed to a position measuring instrument comprising a scanning graduation, a measuring graduation, a centering flange, a positioning guide and a stop, wherein the scanning graduation is positioned radially with respect to the measuring graduation by positioning the stop against the centering flange and the scanning graduation is adjustable along the guide to a predetermined angular and spatial orientation with respect to the measuring graduation.

According to a preferred embodiment of the present invention, the measuring instrument comprises a graduation unit and a scanning unit. The graduation unit comprises a graduation carrier in the shape of a circular ring, a measuring graduation located on the carrier and a centering flange. The graduation carrier is cemented centrally to the centering flange. The measuring graduation is scanned by the scanning unit which comprises a scanning component and a stop. The scanning component comprises a scanning graduation. In the preferred embodiment the graduation unit may be attached to the shaft of a machine. The scanning unit may then be fastened to the stator of the machine and positioned radially by setting the stop against the centering flange. Next, the scanning component is moved along a guide in the axial direction until the scanning graduation is located at a predetermined distance from the measuring graduation. The predetermined distance is established by sandwiching a removable spacing foil between the scanning graduation and the measuring graduation. At this position the stop is no longer in contact with the centering flange. The scanning component is then locked into place, completing the installation process.

An advantage of the present invention is that the machine manufacturer has only to center the graduation unit on his machine and provide relatively coarsely toleranced fastening screw holes for the positioning of the scanning device. The exact positioning of the scanning graduation of the scanning unit with resect to the measuring graduation occurs by means of the assembly stop and the axial positioning guide which are integrated into the scanning unit. The exact scanning distance between the measuring graduation and the scanning graduation is established in a simple manner by means of the spacing foil placed between the measuring graduation and the scanning graduation during the assembly process. The spacing foil can be supplied with the instrument.

A further advantage of the present invention is that the centering flange is no longer contacted by the stop upon the completion of the assembly process. Thus the centering flange can be used as an adjustment aid in the assembly process without generating friction during the measuring process.

The invention itself, together with further objects and attendant advantages, will best be understood by reference to the following detailed description, taken in conjunction with the accompanying drawings.

DETAILED DESCRIPTION OF THE PREFERRED EMBODIMENT

Figure 1:
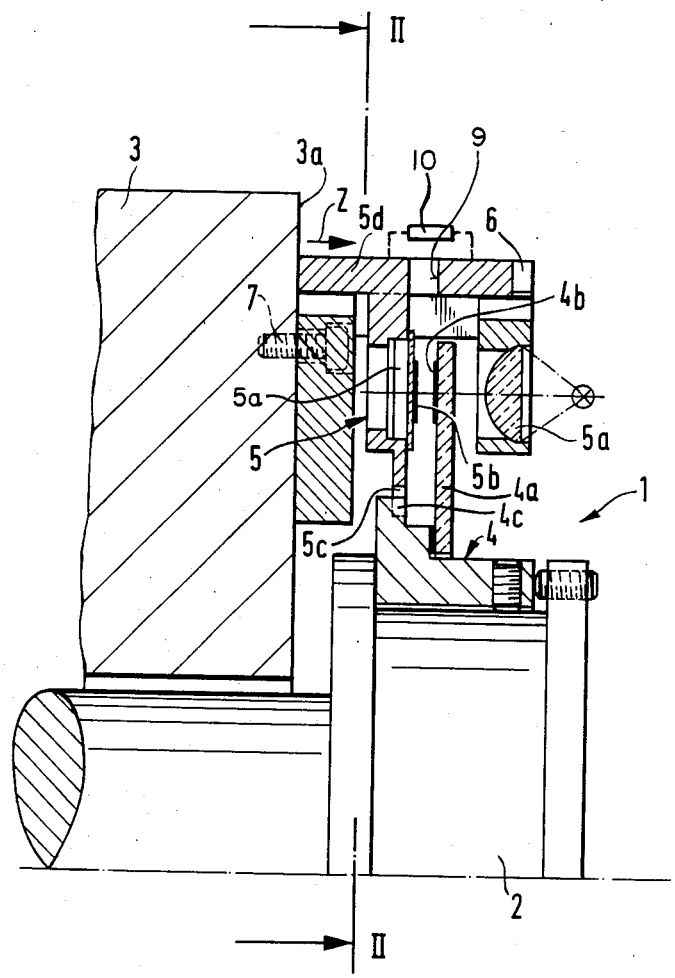
FIG. 1 is a cross-sectional representation showing a presently preferred embodiment of this invention illustrating an angle measuring instrument assembled and mounted, in the unadjusted state, on a machine component.

Turning now to the drawings, FIG. 1 is a cross-sectional representation of an angle measuring instrument 1 mounted on a machine. The machine is not shown in detail. The angle measuring instrument 1 is designed to measure the rotation of a shaft 2 with respect to a stator 3 of the machine. A graduation unit 4 is mounted on the shaft 2 and centered for concentricity. The graduation unit 4 consists of a graduation carrier 4a comprising an angle graduation 4b as the measuring graduation. The graduation carrier 4a is shaped as a circular ring and cemented exactly centrally to a centering flange 4c. The assembling and centering of the graduation unit 4 to the shaft 2 is by well known means and will therefore not be discussed in further detail.

The angle graduation 4b is scanned in a known manner by a scanning unit 5. The scanning unit 5 comprises, in addition to other known scanning elements 5a, a scanning graduation 5b which must be precisely adjusted both radially and axially with respect to the angle graduation 4b.

The radial positioning of the scanning graduation 5b is by means of a stop 5c. The stop 5c and scanning graduation 5b are elements of the scanning component 5d. The axial adjustment of the scanning graduation 5b occurs by sliding the scanning component 5d in a guide 6 which runs in a direction perpendicular to the assembly surface 3a of the stator 3.

During the assembly process, once the graduation unit 4 is mounted and adjusted in the above described manner, the scanning unit 5 is mounted on the assembly surface 3a of the stator 3 by means of screws 7. The position of the corresponding threaded holes (not designated in detail) in the stator 3 is subject to relatively coarse tolerances which can easily be maintained by the machine manufacturer. The scanning unit 5 comprises broadly dimensioned passage holes for the screws 7, so that the scanning unit 5 is movable, within certain limits, on the assembly surface 3a and can therefore be adjusted.

Figure 2:
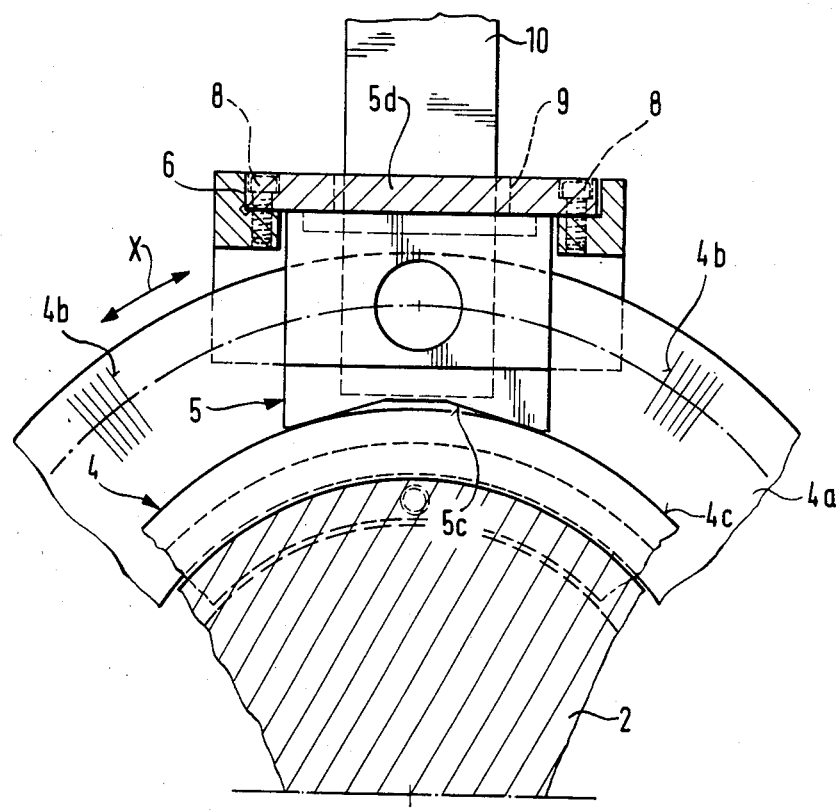
FIG. 2 is a cross-sectional representation along section line II—II of the angle measuring instrument of FIG. 1.

The first step of the adjusting process is the alignment of the scanning unit 5 in the radial direction, as illustrated in FIG. 2. The scanning component 5d is fixed on the scanning unit 5 by means of screws 8. The screws 7, for fastening the scanning unit 5 to the assembly surface 3a of the stator 3, are only slightly tightened so that the scanning unit 5 is just barely slidable on the assembly surface 3a. The screws 7 are not shown in FIG. 2.

The complete scanning unit 5 is then slid radially to the center of the graduation unit 4 until the V-shaped stop 5c of the scanning unit 5 lies firmly against the centering flange 4c of the graduation unit 4. At least one first coil spring, not shown, is used to bias the V-shaped stop 5c against the centering flange 4c. The V-shaped stop 5c contacts the centering flange 4c at two points thereby assuring an exact radial and central centering. Next, the screws 7 are tightened so that the scanning unit 5 is securely fastened in this position to the stator 3.

The screws 8 are now loosened to permit the scanning component 5d to slide along the guide in the direction perpendicular to the assembly surface 3a of the stator 3. As shown in FIG. 2, the sliding of the scanning component 5d would occur into the drawing plane. At least one second coil spring 10 is used to bias the scanning component 5d towards the measuring carrier 4a. The first end of the spring is attached to the scanning unit 5 and the second end of the spring is attached to the scanning component 5d. The spring also operates to bias the scanning component 5d transversely within the guide 6.

A slit 9 located in the scanning unit 5 permits the introduction of a spacing foil 10, of a predetermined thickness, between the angle graduation 4b and the scanning graduation 5b. The thickness of the spacing foil 10 is selected to correspond exactly to the required scanning distance between the angle graduation 4b and the scanning graduation 5b. The scanning component 5d is positioned such that the spacing foil 10 is sandwiched between the scanning graduation 5b and the angle graduation 4b. The screws 8 are then tightened and the spacing foil 10 is removed by pulling it out through the slit 9.

Figure 3:
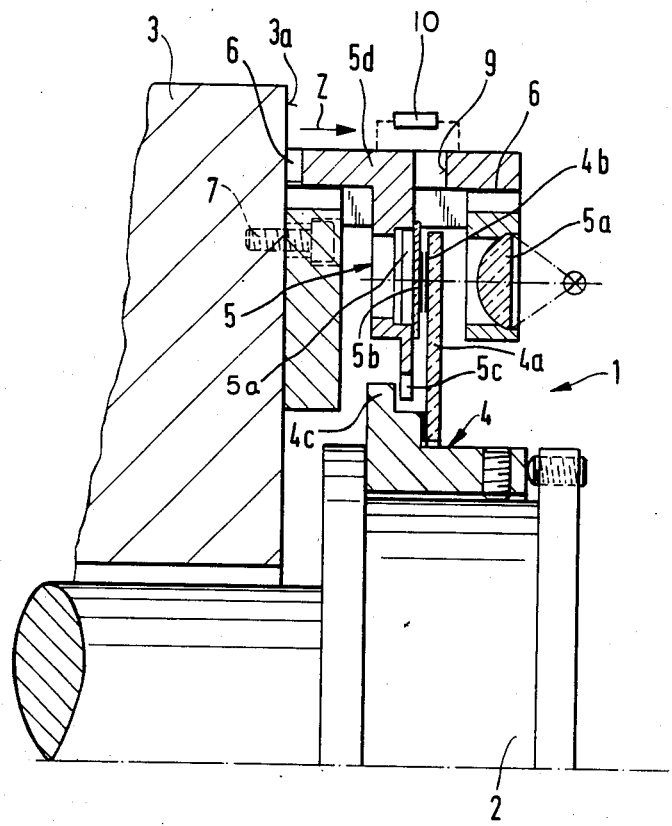
FIG. 3 is a cross-sectional representation of the angle measuring instrument of FIG. 1 in the adjusted state.

The angle graduation 4b now lies opposite the scanning graduation 5b and separated by the exact scanning distance as shown in FIG. 3. During the positioning of the scanning component 5d in the direction perpendicular to the assembly surface 3a of the stator 3, the V-shaped stop 5c slides free of the centering flange 4c. At this point the angle measuring instrument is fully assembled and adjusted. The centering flange 4c, which must be exactly aligned in any case, is a suitable adjustment aid since, when the assembly of the present invention is completed, the stop 5c no longer contacts the centering flange 4c to create disruptive friction during the measurement operation.

With the present invention, it is not necessary to use troublesome, sensitive measurement sensors and dial gauges. Only the spacing foil 10, which may accompany the instrument, is needed. The spacing foil 10 may even fulfill a further function by being in the form of a printed guarantee card.

The present invention is not restricted to angle measuring devices. The invention may also be used, with analogous modifications of various components, in linear measuring systems.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

I claim:

1. A measuring system for measuring the position of two objects each defining an assembly surface and movable relatively to one another of the type comprising a measuring carrier and at least one scanning device, the measuring carrier comprising a measuring graduation which defines a measuring direction, the scanning device comprising a scanning graduation and operative such that the scanning graduation is adjustable with respect to the measuring graduation, the positioning of the scanning graduation with respect to the measuring graduation being aided by the assembly surfaces, the improvement comprising:

a stop surface located on one of the assembly surfaces;

a stop located on the scanning device to position the scanning device in a direction parallel to the measuring scale and perpendicular to the measuring direction by contacting the stop surface;

a guide operative to direct the scanning device to a predetermined angular and spatial orientation with respect to the measuring carrier; and the stop surface, guide and stop cooperating such that the stop only contacts the stop surface when the scanning device is positioned within a predetermined region along the guide.

2. The invention of claim 1 wherein the measuring graduation defines an angle graduation in the shape of a graduated circle, and wherein the stop surface comprises a centering flange, and wherein the stop is V-shaped and is operative with the centering flange to radially adjust the position of the scanning device by contacting the centering flange at two points.

3. The invention of claim 1 wherein the improvement comprises:

a plurality of springs to bias the scanning device along the guide; and locking means to prevent movement of the scanning device at any position along the guide.

4. The invention of claim 1 wherein the improvement comprises:

a spacing foil removably located between the scanning graduation and the measuring graduation to position the scanning graduation at a predetermined distance from the measuring graduation by limiting the movement of the scanning device along the guide in the direction perpendicular to the other one of the assembly surfaces.

5. The invention of claim 1 wherein the stop no longer contacts the stop surface when the scanning device is located at a predetermined scanning distance from the measuring carrier.

6. A position measuring system for measuring the angular position of two objects each defining an assembly surface and movable relatively to one another of the type comprising a circular measuring carrier and at least one scanning device, the measuring carrier comprising an angle measuring graduation which defines a measuring direction and an axial direction, the scanning device comprising a scanning graduation and operative such that the scanning graduation is adjustable with respect to the measuring graduation, the positioning of the scanning graduation with respect to the measuring graduation being aided by the assembly surfaces, the improvement comprising:

a centering flange located on one of the assembly surfaces and secured to the measuring carrier;

a first positioning guide located on the other one of the assembly surfaces and operative to orient the scanning device in a predetermined angular position with respect to the measuring graduation;

a V-shaped stop mounted to the scanning device to contact the centering flange to orient the scanning device in a predetermined radial position with respect to the measuring graduation;

first locking means for preventing movement of the scanning device in the radial direction with respect to the measuring graduation;

a second positioning guide operative to guide the scanning device in the axial direction;

biasing means for biasing the scanning device along the second guide in the axial direction towards the measuring graduation;

a spacing foil removably positioned between the measuring graduation and the scanning graduation for positioning the scanning device at a predetermined distance from the measuring graduation; and second locking means for preventing movement of the scanning device along the second guide;

the centering flange, second guide and stop cooperating such that the stop no longer contacts the centering flange when the scanning device is located at a position spaced from the measuring graduation by the thickness of the spacing foil.

* * * * *

UNITED STATES PATENT AND TRADEMARK OFFICE
CERTIFICATE OF CORRECTION

PATENT NO. : 4,663,851

DATED : May 12, 1987

INVENTOR(S) : Kurt Feichtinger

It is certified that error appears in the above-identified patent and that said Letters Patent is hereby corrected as shown below:

On the title page

IN THE SECTION ENTITLED "OTHER PUBLICATIONS"

In the "Geratehandbuch Fur Einbau-Winkelmesseinrichtung" reference, please delete "19384" and substitute therefor --16384--.

Signed and Sealed this

Twenty-sixth Day of April, 1988

Attest:

DONALD J. QUIGG

*Attesting Officer*   *Commissioner of Patents and Trademarks*